(12) United States Patent
Kwak

(10) Patent No.: US 9,589,746 B2
(45) Date of Patent: Mar. 7, 2017

(54) SWITCH DEVICE FOR VEHICULAR AIR CONDITIONING SYSTEM

(71) Applicant: HYUNDAI MOTOR COMPANY, Seoul (KR)

(72) Inventor: Jung Mo Kwak, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 256 days.

(21) Appl. No.: 14/569,514

(22) Filed: Dec. 12, 2014

(65) Prior Publication Data

US 2016/0104589 A1    Apr. 14, 2016

(30) Foreign Application Priority Data

Oct. 14, 2014    (KR) .................. 10-2014-0138009

(51) Int. Cl.
| | |
|---|---|
| *B60H 1/34* | (2006.01) |
| *H01H 13/08* | (2006.01) |
| *B60H 1/00* | (2006.01) |
| *H01H 13/02* | (2006.01) |

(52) U.S. Cl.
CPC ............. *H01H 13/08* (2013.01); *B60H 1/00* (2013.01); *H01H 13/023* (2013.01)

(58) Field of Classification Search
CPC .......... B60H 1/34; F24F 13/15; H01H 19/02; H01H 3/12

USPC ........................................ 200/52 R; 361/692
See application file for complete search history.

(56) References Cited

U.S. PATENT DOCUMENTS

2009/0286462 A1* 11/2009 Goto .................... B60H 1/3428
454/155

FOREIGN PATENT DOCUMENTS

| JP | 07-117465 A | 5/1995 | |
| JP | 2004-025960 | * 6/2002 | ............... B60H 1/34 |
| JP | 2004-025960 A | 1/2004 | |
| KR | 10-2008-0037279 A | 4/2008 | |
| KR | 20-2010-0003588 U | 4/2010 | |
| KR | 10-2010-0045248 A | 5/2010 | |
| KR | 20-2014-0000371 U | 4/2014 | |

* cited by examiner

*Primary Examiner* — Edwin A. Leon
*Assistant Examiner* — Iman Malakooti
(74) *Attorney, Agent, or Firm* — McDermott Will & Emery LLP

(57) ABSTRACT

A switch device for a vehicular air conditioning system includes a transverse wing surrounded by a knob of an air vent. A circuit board is mounted to an inner side of the transverse wing. The button switch for controlling an air conditioner and an air amount is connected to a switch contact portion of the circuit board to contact the switch contact portion of the circuit board and mounted to an upper surface of the knob. A connector connects a connecting portion formed at a rear portion of the circuit board and an air conditioning controller.

7 Claims, 2 Drawing Sheets

-- Prior Art --

SWITCH DEVICE FOR VEHICULAR AIR CONDITIONING SYSTEM

CROSS-REFERENCE TO RELATED APPLICATION

This application claims under 35 U. S. C. §119(a) the benefit of priority to Korean Patent Application No. 10-2014-0138009 filed on Oct. 14, 2014, the entire contents of which are incorporated herein by reference.

TECHNICAL FIELD

The present disclosure relates to a switch device for a vehicular air conditioning system. More particularly, the present disclosure relates to a switch device for a vehicular air conditioning system for adjusting a wind direction.

BACKGROUND

A center fascia panel is mounted on a front surface of a dashboard between a driver's seat and a passenger's seat inside a vehicle, and includes an audio device, a navigation device, an air conditioning control device, and the like are collectively.

Referring to FIG. 1, an air conditioning control device 10 controls an air conditioning system such as a heater or an air conditioner (AC), and includes an air conditioner ON/OFF switch 11, an air flow rate control switch 12, and a temperature control switch 13.

In addition, as a configuration of the air conditioning system, air vents 20 are provided on a front side of a driver's seat, a passenger's seat, and at an upper portion of a center fascia panel.

Accordingly, when a user operates the heater or the AC, air enters inside a vehicle through the air vents 20 by operating the air conditioner ON/OFF switch 11 and the air flow rate control switch 12.

Further, the user manipulates a knob 22 provided in the air vents 20 to change a direction of the air vents 20 so that the air is discharged in a desired direction.

In addition, the user rotates and manipulates an air amount control dial 24 of the air vent 20 during an operation of the heater or the AC to control the amount of air. The user needs to alternately manipulate the air conditioning control device 10 and the air vent 20 to operate the air conditioning system while driving the vehicle, and thus, the user (a driver in this case) may feel inconvenience and may cause an accident.

That is, the user manually operates the air conditioner ON/OFF switch, the air flow control switch, the air vent knob to change the direction of air, and thus, the user may feel inconvenient and may face a dangerous situation.

SUMMARY OF THE DISCLOSURE

An aspect of the present inventive concept provides a switch device for a vehicular air conditioning system through which an air conditioning ON/OFF operation can be made by a knob of an air vent. The switch device can switch on and off an air conditioner and control an amount of air, such that a direction of air can be controlled by the user.

In accordance with an exemplary embodiment of the present inventive concept, a switch device for a vehicular air conditioning system includes a transverse wing surrounded by a knob of an air vent. A circuit board mounted to an inner side of the transverse wing. A button switch, which controls an air conditioner on/off and an air amount, is connected to a switch contact portion of the circuit board to contact the switch contact portion of the circuit board and mounted to an upper surface of the knob. A connector connects a connecting portion formed at a rear portion of the circuit board and an air conditioning controller.

A circuit board mounting hole having a predetermined depth is formed on a rear surface of the transverse wing. A switch assembly hole is formed in the transverse wing and at an upper portion of the knob.

A light-emitting diode (LED) is attached to an end of the circuit board and emits light through a light emission hole formed in the knob and at an end of a transverse wing.

A guide having a vertical push movement path of the button switch is inserted into and mounted to the knob and the transverse wing.

The circuit board is connected to the air conditioning controller by the connector to exchange electrical signals with the air conditioning controller. An air conditioning second stage ON request signal is transmitted when the button switch is pushed one time. An air conditioning four stage ON request signal is transmitted when the button switch is pushed two times. An air conditioning six stage ON request signal is transmitted when the button switch is pushed three times. An OFF request signal is transmitted when the button switch is pushed four times.

A tail lamp controller is connected to the circuit board to exchange electrical signals with the circuit board to receive a tail lamp ON/OFF signal and to turn on and off the LED.

The present disclosure has the following effect.

First, by switching on and off the air conditioner and controlling the amount of air at the same location of the knob, manipulation convenience can be provided and an unnecessary operation can be minimized while driving a vehicle, thus increasing the safety.

Second, an air amount control dial of the air vent for controlling the amount of air and related components can be excluded, and thus, the size of the air vent can be increased and a degree of freedom in designing the air vent can be obtained.

Third, as the size of the air vent increases, cooling/heating performance of the vehicle can be improved by securing the amount of air discharged into the interior of the vehicle.

Fourth, because an LED illumination is provided at the knob of the air vent, a location of the switch can be clearly recognized at night.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present disclosure.

Figure 1:
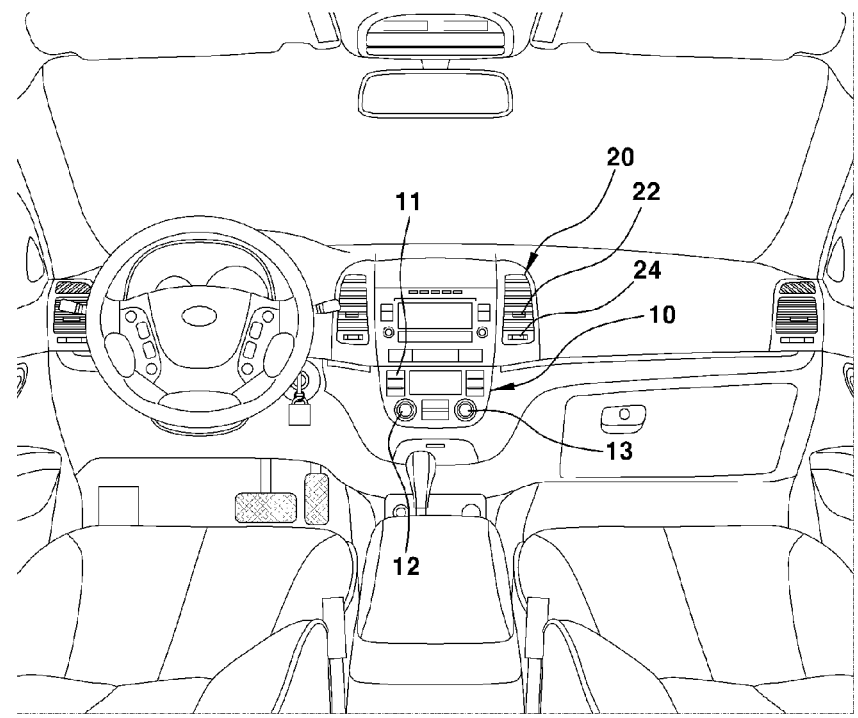
FIG. 1 is a schematic view showing an air conditioning control device for a vehicle and a location of an air vent.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, an exemplary embodiment of the present an exemplary embodiment of will be described in detail with reference to the accompanying drawings.

The present disclosure provides a switch device for a vehicular air conditioning system through which an air conditioning ON/OFF operation can be made by a knob of an air vent, which switches on and off an air conditioner, controls an amount of air, such that an air direction can be controlled by a user.

Figure 2:
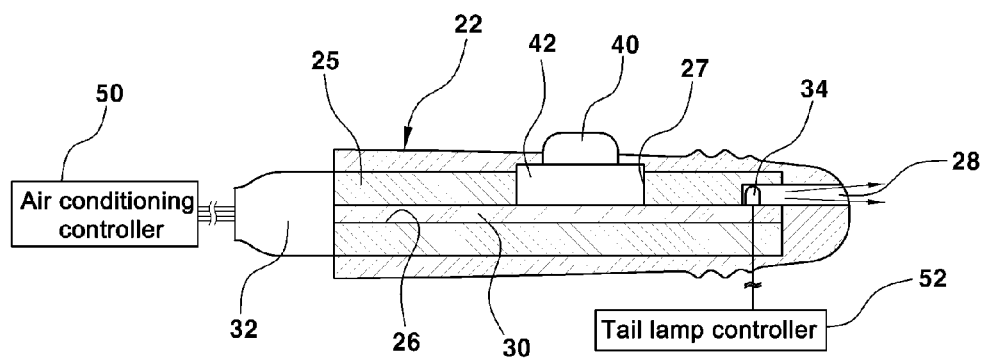
FIG. 2 is a sectional view showing an installation state of a switch device for a vehicular air conditioning system according to an exemplary embodiment of the present inventive concept.
Figure 3:
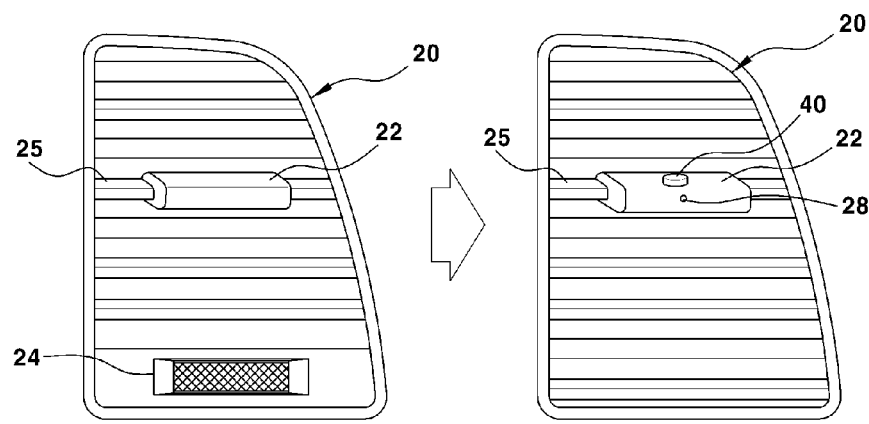
FIG. 3 shows before and after installation of the switch device in an air vent according to an exemplary embodiment of the present inventive.

FIG. 2 is a sectional view showing an installation state of a switch device for a vehicular air conditioning system according to an exemplary embodiment of the present disclosure. FIG. 3 shows before and after installation of the switch device in an air vent according to an exemplary embodiment of the present inventive concept.

Reference numeral 20 refers to an air vent in a crush pad mounted on a front side of a driver's seat, a passenger's seat and at an upper portion of a center fascia panel.

The air vent 20 includes a transverse wing 25 and a longitudinal wing (not shown). A knob 22 controls directions of the transverse wing 25 and the longitudinal wing and is coupled to the transverse wing 25. A rear portion of the knob 22 has a link structure (not shown) connected thereto for angularly rotating the transverse wing 25 and the longitudinal wing.

Accordingly, when the knob 22 is manipulated to direct to a left or right direction, the longitudinal wing angularly rotates to the left or right direction. When the knob 22 is gripped and manipulated upwards or downwards, the transverse wing 25 angularly rotates upwards or downwards, such that a direction of air discharged from the air vent 20, that is, a wind direction is controlled.

Here, a printed circuit board (PCB) 30 for controlling switching ON/OFF of an air conditioner (AC) and the air direction is disposed inside the transverse wing 25 which is surrounded by the knob 22 of the air vent 20.

A circuit board mounting hole 26 having a predetermined depth may be formed on a rear surface of the transverse wing 25 of the air vent 20, or the transverse wing 25 is formed to have the circuit board mounting hole 26. Accordingly, the circuit board 30 may be mounted to the inside the transverse wing 25 by inserting the circuit board 30 through the transverse wing 25.

A switch assembly hole 27 is formed in the transverse wing 25 and at an upper portion of the knob 22 and communicates with a switching contact point of the circuit board 30. A hollow guide 42 having a vertical push passage for a button switch 40 is inserted into and mounted to the switch assembly hole 27, and the button switch 40 is mounted to the interior of the hollow guide 42.

The button switch 40, which switches ON/OFF the AC and controls the amount of air, is inserted into and mounted to the hollow guide 42 to be pushed such that a lower end of the button switch 40 contacts a switching contact portion of the circuit board 30 when being pushed.

A connector 32 for exchanging electrical signals with an air conditioning controller 50 is connected to a connecting portion of the circuit board 30 formed at a rear side of the circuit board 30.

In more detail, the circuit board 30 is connected to the air conditioning controller 50 by the connector 32 to exchange the electrical signals with the air conditioning controller 50. When the button switch 40 is pushed one time, an air conditioning second stage ON request signal is transmitted. An air conditioning four stage ON request signal is transmitted when the button switch 40 is pushed two times. An air conditioning six stage ON request signal is transmitted when the button switch 40 is pushed three times. An OFF request signal is transmitted when the button switch 40 is pushed four times.

A light emission hole 28 for emitting light of a light-emitting diode (LED) 34 illumination is formed in the knob 22 and at an end of the transverse wing 25. The user can easily recognize a location of the button switch 40 at night by the emitted light from the LED 34 mounted to the end of the circuit board 30 to inside of the vehicle through the light emission hole 28.

Then, a tail lamp controller 52 is further connected to the circuit board 30 to exchange the electrical signals with the circuit board 30 to receive a tail lamp ON/OFF signal and to turn on and off signal for the LED 34.

Here, an operation of the switch device for an air conditioning system according to the present disclosure will be described below.

When the AC or the heater is switched on while driving the vehicle, if the user pushes the button switch 40 one time, the circuit board 30 transmits an air conditioning second stage ON request signal according to the one time push of the button switch 40 to the air conditioning controller 50.

Subsequently, the amount of air corresponding to an air conditioning second stage is discharged into the interior of the vehicle through the air vent 20 by controlling the air conditioning apparatus in the air conditioning second stage by the air conditioning controller 50.

If the button switch 40 is pushed twice, the circuit board 30 transmits an air conditioning fourth stage ON request signal according to the two time push of the button switch to the air conditioning controller 50, so that the amount of air corresponding to an air conditioning fourth stage is discharged into the interior of the vehicle.

If the button switch 40 is pushed three times, the circuit board 30 transmits an air conditioning sixth stage ON request signal according to the three time push of the button switch to the air conditioning controller 50, so that the amount of air corresponding to an air conditioning sixth stage is discharged into the interior of the vehicle.

If the button switch 40 is pushed four times, the circuit board 30 transmits an OFF request signal according to the four time push of the button switch 40 to the air conditioning controller 50, so that the air conditioning apparatus stops operating by an OFF control of the air conditioning controller 50.

In this way, the operation of pushing the button switch 40 one to four times are repeated, the amount of air may be controlled according to the air conditioning second to sixth stages to be discharged into the interior of the vehicle, and the air conditioning apparatus may be switched off.

In this way, because an operation of switching on and off the air conditioner and an operation of controlling an amount of air are performed at the same location of the knob, user convenience can be improved and an unnecessary operation can be minimized during driving of the vehicle so that the vehicle can be safely driven.

Because the amount of air is controlled to be suitable for the air conditioning second to sixth stages by pushing the button switch 40 one to three times and the air is discharged into the interior of the vehicle, an air amount control dial and related components provided at a lower end of the air vent to control the amount of air are not necessary.

Further, the size of the air vent can be increased by excluding the air amount control dial and the related components, and cooling/heating performance of the interior of the vehicle can be improved by securing the amount of air discharged into the interior of the vehicle as the size of the air vent increases.

When driving the vehicle at night, the driver turns on a tail lamp by manipulating a tail lamp switch and an LED ON signal is transmitted from the tail lamp controller 52 to the circuit board 30, and accordingly, the circuit board 30 turns on the LED 34.

Accordingly, because light of the LED 34 mounted to the end of the circuit board 30 is emitted toward the interior of the vehicle through the light emission hole 28 formed at the tip end of the transverse wing 25, the user can easily recognize a location of the button switch 40 at night.

What is claimed is:

1. A switch device for a vehicular air conditioning system, comprising:
   a transverse wing surrounded by a knob of an air vent;
   a circuit board mounted to an inner side of the transverse wing;
   a button switch for controlling an air conditioner and an air amount connected to a switch contact portion of the circuit board to contact the switch contact portion of the circuit board and mounted to an upper surface of the knob; and
   a connector connecting a connecting portion formed at a rear portion of the circuit board and an air conditioning controller.

2. The switch device of claim 1, wherein a circuit board mounting hole having a predetermined depth is formed on a rear surface of the transverse wing of the air vent, and a switch assembly hole is formed in the transverse wing and at an upper portion of the knob.

3. The switch device of claim 1, further comprising:
   a light-emitting diode (LED) attached to an end of the circuit board and emitting light through a light emission hole formed in the knob and at an end of the transverse wing.

4. The switch device of claim 1, further comprising:
   a guide having a vertical push movement path of the button switch and inserted into and mounted to the knob and the transverse wing.

5. The switch device of claim 1, wherein the circuit board is connected to the air conditioning controller by the connector to exchange electrical signals with the air conditioning controller such that an air conditioning second stage ON request signal is transmitted when the button switch is pushed one time, an air conditioning four stage ON request signal is transmitted when the button switch is pushed two times, an air conditioning six stage ON request signal is transmitted when the button switch is pushed three times, and an OFF request signal is transmitted when the button switch is pushed four times.

6. The switch device of claim 1, further comprising:
   a tail lamp controller connected to the circuit board to exchange electrical signals with the circuit board to receive a tail lamp ON/OFF signal and to turn on and off the an LED.

7. The switch device of claim 5, wherein the amount of air entering the inner side of a vehicle through the air vent is controlled according to an air conditioning stage ON request signal.

* * * * *